United States Patent [19]
Fletcher et al.

[11] 3,977,787
[45] Aug. 31, 1976

[54] HIGH-RESOLUTION FOURIER INTERFEROMETER-SPECTRO-PHOTOPOLARIMETER

[76] Inventors: James C. Fletcher, Administrator of the National Aeronautics and Space Administration, with respect to an invention of; Alain L. Fymat, Pasadena, Calif.

[22] Filed: May 5, 1975

[21] Appl. No.: 574,219

[52] U.S. Cl. .............................. 356/106 S; 356/244; 356/209; 356/114
[51] Int. Cl.² ........................ G01B 9/02; G01J 4/00
[58] Field of Search ........... 356/244, 209, 210, 212, 356/73, 106 R, 106 S, 114

[56] References Cited
UNITED STATES PATENTS

| | | | |
|---|---|---|---|
| 3,572,951 | 3/1971 | Rothwarf | 356/212 |
| 3,687,519 | 8/1972 | Mapes | 356/209 |
| 3,700,334 | 10/1972 | Low et al. | 356/106 R |
| 3,728,030 | 6/1970 | Hawes | 356/106 |

*Primary Examiner*—John K. Corbin
*Assistant Examiner*—Conrad Clark
*Attorney, Agent, or Firm*—Monte F. Mott; Paul F. McCaul; John R. Manning

[57] ABSTRACT

A high-resolution Fourier interferometer-spectrophotopolarimeter is provided using (i) a single linear polarizer-analyzer the transmission axis azimuth of which is positioned successively in the three orientations of 0°, 45°, and 90°, in front of a detector; (ii) four flat mirrors, three of which are switchable to either of two positions to direct an incoming beam from an interferometer to the polarizer-analyzer (1) around a sample cell (2) transmitted through a medium in a cell and (3) reflected by medium in the cell; and (iii) four fixed focussing lenses, all located in a sample chamber attached at the exit side of the interferometer. This arrangement can provide the distribution of energy and complete polarization state across the spectrum of (a) the reference light entering from the interferometer; (b) the same light after a fixed-angle reflection from the sample cell containing a medium to be analyzed; and (c) the same light after direct transmission through the same sample cell, with the spectral resolution provided by the interferometer.

16 Claims, 4 Drawing Figures

HIGH-RESOLUTION FOURIER INTERFEROMETER-SPECTROPHOTOPOLARIMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to Fourier spectropolarimetry, and more particularly to a high-resolution Fourier interferometer-spectrophotopolarimeter.

In the presence of a scattering medium, a beam of radiation is modified in intensity and polarization. It is known that the effect depends upon two causes: the relative importance of scattering and absorption in attenuating the intensity of hte original beam (the single scattering albedo of the carrier medium), and the scattering diagram of particles in the medium appropriate for both intensity and state of polarization (the phase-matrix of scattering of the medium). These two characteristics are wavelength dependent, and hence the spectral variations of the observed radiation intensity and state of polarization, particularly the corresponding line profiles, can yield information about the medium composition and structure.

The information contained in the intensity variations has been systematically exploited by use of photometers for ultra-low (continuum) spectral resolution studies, and of monochromators for studies of isolated spectral lines at high-resolution. Multiplexing spectrometers, namely Fourier interferometers, have given impetus to these studies because they are capable of effecting high-resolution studies over extended wavelength intervals. However, multiplexing spectrometers measure only the intensity of absorption or emission bands spreading across large wavelength intervals. It has been proposed by the inventor and Krishna D. Abhyankar that an interferometer-polarimeter be developed to study moderate to high resolution spectra of polarization state of absorption or emission bands. (See Fymat, A. L. and K. D. Abhyankar, "An Interferometric Approach to the Measurement of Optical Polarization", *Applied Optics*, 1970, 9:1075–1081, and Fymat, A. L., "Interferometric Spectropolarimetry: Alternate Experimental Methods", *Applied Optics*, 1972 11: 2255–2264.) Thus, it has been proposed that studies go beyond obtaining merely the Stokes parameter of light which defines intensity (I) and to obtain the state of polarization (degree of polarization, orientation of plane of polarization, ellipticity of polarization ellipse) across spectrum with any desired resolution achievable by a two-beam, amplitude division interferometer such as Michelson's interferometer.

An instrument based on the work of the present inventor and Krishna D. Abhyankar, as reported in the first publication listed hereinabove, has been disclosed in U.S. Pat. No. 3,700,334. The method on which that instrument is based will hereafter be referred to as a "first method". A simplified version of that instrument, based on the further work of the inventor, was reported in the second reference listed hereinabove and actually built for telescopic observations of solar light diffusely reflected from planetary atmospheres. The method on which the latter instrument is based (referred to hereinafter as the "second method") uses only a single polarizer-analyzer whose transmission axis can have several orientations, as compared to the set of three polarizers in the first method, two of which are of variable orientation as shown in the aforesaid patent. The second method is thus able to analyze much weaker light sources. The instrument has operated at the Steward Observatory, Tucson, Ariz., and the National Mexican Observatory, Baja California, Mexico, to (i) provide the first polarization spectra of the planet Venus in the wavelength of 0.8 micrometers ($\mu$m) to 2.7 $\mu$m at the full instrument resolution of 0.5 cm$^{-1}$; (ii) to verify experimentally the existence of the phenomenon of spectral polarization theoretically predicted by the present inventor (see Fymat, A. L., "Polarization in Astronomical Spectra: Theoretical Evidence" in *Planets, Stars and Nebulae Studied with Photopolarimetry*, editor: T. Gehrels, University of Arizona Press, 1974. 617–636); and (iii) to similarly verify the inventor's theoretical prediction of the effect of polarization on the spectral line shape and on the structure of vibration-rotation bands (see Fymat, op. cit. supra). Complete instrument description and polarization spectra can be found in: Forbes, F. F. and Fymat, A. L., "Astronomical Fourier Spectropolarimetry", in *Planets, Stars and Nebulae Studied with Photopolarimetry*, op. cit. supra at 637–660. That instrument was for producing interferograms of atmospheric radiation incident on the apparatus. From the interferograms, the four Stokes parameters defining both intensity and state of polarization can be concurrently determined. The parameters are the intensity, I, and O, U and V which gave, respectively: degree of polarization, orientation of the plane of polarization, and ellipticity of the polarization ellipse.

Conventionally, the Stokes parameters can be obtained by making four suitably chosen measurements. For example, total intensity (I) may be obtained by using successively 0° and 90° linear polarizer-analyzers in the usual photopolarimetric arrangement, and summing the corresponding data. Alternatively, it may also be obtained by Fourier transform spectroscopy using an ordinary unmodified Michelson interferometer. The main difference between these two measurements is the considerably higher spectral resolution that can be achieved by the interferometer; it is typically three orders of magnitude finer. Measuring degree of polarization (Q) also requires the use of 0° and 90° polarizer-analyzers identically as above, but now followed by differencing of the corresponding data. The remaining two parameters (U and V) can be obtained by using a 45° linear polarizer-analyzer and a compensator, such as a wave plate which, in the plane transverse to the direction of light propagation, retards the phase of one component of the light electric vector with respect to the other component by a fixed amount, 0° and 90° respectively.

Typically, three of the required four measurements are made by employing a fixed 0°-retarder and a rotating linear polarizer-analyzer whose transmission axis azimuth is successively oriented along the directions 0°, 45° and 90°, in optical series relationship. The fourth measurement is obtained by using a fixed 90°-retarder and the 45°-polarizer. This is an irreducible set of measurements suggested by the inventor and Krishna D. Abhyankar in "An Interferometric Approach to the Measurement of Optical Polarization", *Applied Optics*, 1970, 9:1075–1081, who showed that the additional two measurements suggested earlier are redundant. These two measurements would employ a 135°-polarizer and 0°- and 90°-retarder, respectively. See, for example, Born, M., and Wolf, E., *Principles of Optics*, 4th edition, Pergamon Press, 1970, at page 546. However, except for ordinary Fourier transform spectrometry which considers only the total intensity (I), these conventional techniques do not provide the degree of resolution necessary for analysis of the spectra of, for example, relatively unknown gaseous, liquid, or solid media, or media containing elements in some or all of these phases. On the other hand, if the conventional photopolarimeters are coupled with high-resolution spectrometers (e.g., a Fabry-Perot interferometer) which will act as filters, and the spectral lines in the wavelength range of interest are scanned one by one, then, high-resolution may, in principle, be achieved. However, in these arrangements, the amount of light energy falling on the detector would be so small that the signal-to-noise ratio would be insignificant. Adequate signal-to-noise ratio values and spectral resolutions are both necessary. These two requirements can be achieved only by interferometer-polarimeters.

The instrument described in the aforesaid patent generally includes any standard or conventional two-beam, amplitude division interferometer which is modified by the inclusion of a polarizer in each of the beams and an analyzer positioned in front of a sensor or recording device. More specifically, the system employs a beam-splitter which serves to divide light from a selected light source into a pair of individual light beams. Each of the light beams is directed through a polarizer. The polarizers are positioned to have preselected planes of polarization with respect to each other and with respect to the plane of polarization of the analyzer. The polarized light beams are applied to a variable optical retarder which serves to selectively modify the relative optical path lengths of the light beams. An optical mixer may be employed to recombine the two light beams. The recombined light beams are projected through an analyzer, such as a linear polarizer, to a sensor or recording device. In the case of a Michelson interferometer, the beam-splitter and the mixer form a single instrumental component, and the variable retarder is the interferometer itself. In the inventor's further work, three additional spectropolarimetric methods are discussed. (See Fymat, A. L., "Interferometric Spectropolarimetry: Alternate Experimental Methods", *Applied Optics*, 1972, 11:2255–2264.) one of these has been discussed hereinbefore as the second method. Another method, which may be referred to as the third method, uses a single linear polarizer-analyzer placed at the entrance of the instrument in the incoming light path, and rotated along the three directions 0°, 45° and 90°. In a fourth method, a hybrid of the second and third methods, a linear polarizer is placed in the incoming light path and an analyzer is placed in front of the detector. Here three alternatives are offered where both polarizer and analyzer at at 0°, and at 90° successively, and: (i) the polarizer is at 45° and the analyzer at 0°; (ii) the polarizer is at 45° and the analyzer is at 90°, or (iii) both the analyzer and polarizer are at 45°. Instead of having both the polarizer and the analyzer successively at 0° and 90°, it is equivalent to use an analyzer at 45° and a polarizer successively at 0° and 90°. Unfortunately, the third and fourth methods provide only I, Q, U and not V.

An instrument based on any of the four methods above described is adapted for measuring only the effect on polarization of optical radiation by a scattering medium to gain information about the medium structure and composition, or measuring the polarization of absorption or emission lines in planets, stars and nebulae, in the air-glow spectrum, and in chemical analyses. The incident radiation has already been subjected to scattering by the medium and there is no opportunity to study separately the effect on polarization of both transmission and reflection of light by the particles composing the medium, especially in relation to a reference beam which would have been unaffected by the medium. It would be desirable to provide for laboratory use an instrument adapted to hold a sample cell in a chamber and obtain data on the distribution of energy and complete polarization state across the spectrum of (i) the reference light entering the chamber, by-passing the sample cell and reaching the detecting device; (ii) the same light after a fixed-angle reflection from a medium to be analyzed, in the sample cell; and (iii) the same light after direct transmission through the medium to be analyzed, with the spectral resolution and light gathering power of Fourier transform spectroscopy.

SUMMARY OF THE INVENTION

A high-resolution Fourier interferometer-spectrophotopolarimeter is provided in accordance with the present invention by an interferometer optically coupled to a vacuum chamber containing a radiation detector, a polarizer-analyzer of variable orientation directly in front of the detector, a sample cell, and means for selectively directing the output beam of the interferometer to the polarizer-analyzer and detector (1) around the cell for reference measurement, (2) through the cell for transmission measurement, and (3) with a predetermined angle of reflection from the cell for reflection measurements of spectral radiant energy and state of polarization of the light beam, said means comprising a first planar mirror in the direct path of the interferometer beam for reflecting the beam 90° in one direction to a pair of planar mirrors which reflect at the same angle in one position, namely 45° for the reference measurements, and a smaller angle for the reflection measurements, and for reflecting the interferometer beam 90° in a direction opposite the one direction to a pair of parallel planar mirrors for transmission measurements. The same pair of planar mirrors is used for the reference and reflection measurements with only a slight alteration of position in switching between the two modes of measurement. The second mirror of the pair for transmission measurements is the same as the second mirror of the pair for the reflection measurements. In that manner only three planar mirrors are used for the reference and reflection modes, and a fourth planar mirror is used with two of the first three mirrors in the transmission mode. This symmetrical arrangement of paired mirrors eliminates by compensation any polarization effects that are otherwise present in reflecting a beam from a planar surface. The first mirror reflects the interferometer beam through an uncompensated angle of 90° from the initial direction in every mode, but since any polarization effect experienced in reflecting the beam off that mirror is present in the reference measurements, the analysis of the state of polarization in the reflection and transmission modes relatively to the reference mode will be unaffected by this polarization, and can be made with any desired resolution using a single linear polarizer-analyzer of variable orientation with transmission axis azimuth at 0°, 45° and 90°.

DESCRIPTION OF PREFERRED EMBODIMENTS

Figure 1:
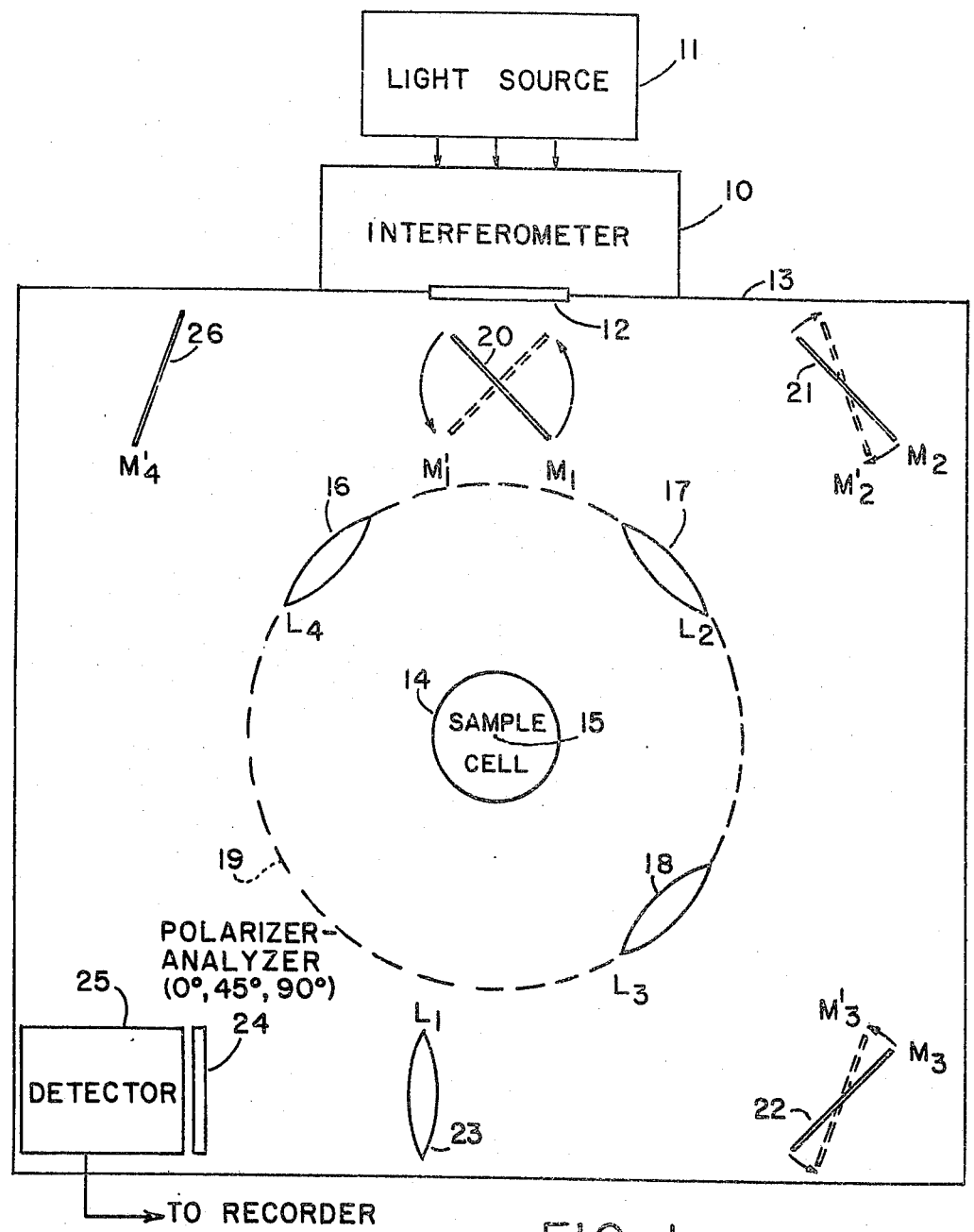
FIG. 1 is a diagram which shows schematically a plan view of a high-resolution Fourier interferometer-spectrophotopolarimeter according to the present invention.

Referring now to FIG. 1, which shows schematically a plan view, a standard two-beam, amplitude division interferometer 10, such as a Michelson interferometer, is employed with any suitable light source 11, polarized or unpolarized, to direct a beam through a window 12 into a vacuum chamber 13.

A cylindrical transparent sample cell 14 stands on end on the floor of the chamber, with its axis 15 at the focal point of three fixed focussing lenses 16, 17 and 18 in a circular arrangement indicated by a dashed line 19 concentric with the cell 14. A first switchable mirror 20 is placed in front of the window 12 to direct the beam at 90° to the right to a second switchable mirror 21 that directs the beam directly (or indirectly) to a third switchable mirror 22. The latter two switchable mirrors are employed as a pair in the position shown to direct the beam around the cell and through a focussing lens 23 to a linear polarizer-analyzer 24 and detector 25. The polarizer-analyzer is adapted to have its transmission axis azimuth positioned successively in the three orientations of 0°, 45° and 90° to obtain three reference interferograms (recorded by conventional means not shown) with the three successive orientations.

Upon switching the paired mirrors 21 and 22 to their alternate positions shown in dashed lines, the incoming beam is reflected by the mirror 21 to the sample cell. Light reflected by the medium in the cell is reflected by the mirror 22 in its alternate (dashed line) position to the focussing lens 23, polarizer-analyzer 24 and detector 25.

The lenses may be held in the fixed spatial arrangement shown by a cylindrical bracket resting on its base on the chamber floor. Alternatively each lens may be held in space by a separate linear bracket between the floor and cover of the chamber 13. The dotted line 19 may thus be regarded as representing either type of bracket. By coating the inside of the chamber and all sides of the lens bracket used with block matte, no light entering through the window 12 is reflected by any surface to the lens 23 except the various mirrors. In that way only light reflected by the medium in the cell reaches the detector 25.

Upon also switching the first mirror 20 to its alternate (dashed line) position, the beam of light entering the chamber is directed 90° to the left toward a fixed mirror 26. That mirror is fixed in position to reflect the beam through the lens 16 to the center of the sample cell. The mirror 26 is now paired with the mirror 22 still in its alternate (dotted line) position to reflect the beam of light transmitted through the medium in the cell onto the detector.

Figure 2:
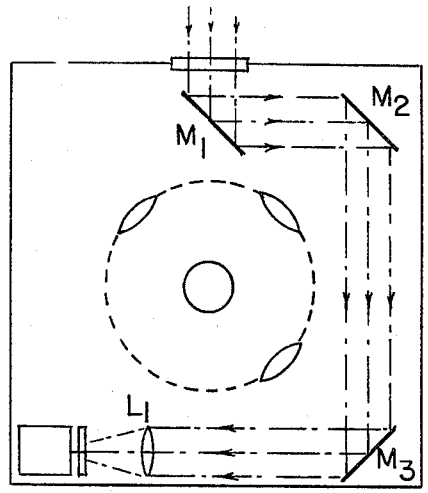
FIGS. 2, 3 and 4 illustrate the respective reference, reflection and transmission modes of measurement.
Figure 3:
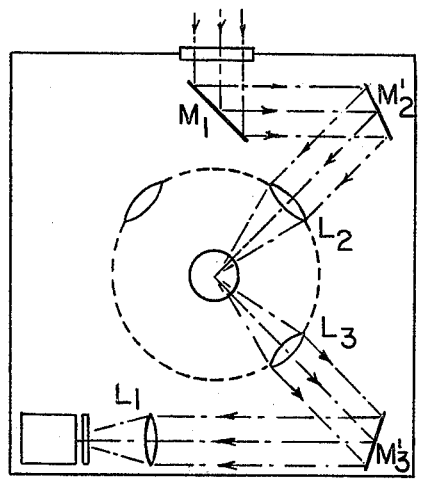
Figure 4:
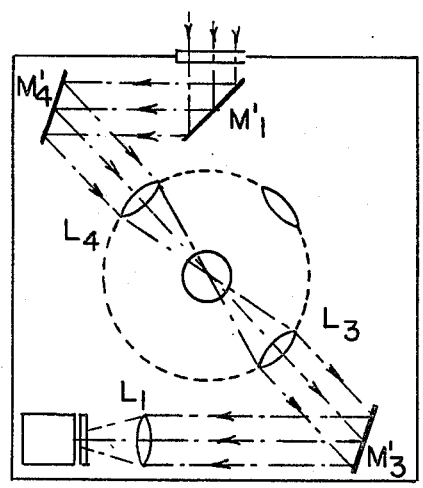

FIGS. 2, 3 and 4 illustrate the positions of the switchable mirrors 20, 21 and 22 for the reference, reflection and transmission modes just described. For each mode, three successive orientations (0°, 45° and 90°) of the polarizer-analyzer provide a total of nine interferograms. These interferograms contain detailed information about the four Stokes parameters of, respectively, the reference light beam, the reflected light beam, and the transmitted light beam. It is thus possible to measure the spectral distributions of both energy (radiance) and complete state of polarization (degree of polarization, orientation of plane of polarization, ellipticity of polarization ellipse) of optical radiation before and after being reflected or transmitted by a sample medium using the high-resolution Fourier spectroscopic method, and to obtain information about the composition, structural and optical properties of the sample medium, through polarimetric and spectroscopic analysis of the interferograms.

For the convenience of the following analysis of the instrument, the switching mirrors are reflected to as mirrors $M_1$, $M_2$ and $M_3$ when in the first position, and $M_1'$, $M_2'$ and $M_3'$ when in the switched (second) position shown in dashed line. The fourth (fixed) mirror is referred to as the mirror $M_4'$. The various lenses are referred to as $L_1$, $L_2$, $L_3$ and $L_4$ when referring to the respective lenses 23, 17, 18 and 16. The analysis of the instrument demonstrates that any polarization of light reflected by the mirrors is compensated. Polarization of light by the mirror $M_1$ (or $M_1'$) is not compensated in the instrument, but is also present in the reference beam data so that it is effectively cancelled later during analyses of the data.

The mathematical characterization of the instrument can best be in the form of 2×2 matrices known as Jones's matrices because information is required on both the amplitude and phase of the light wave incident on the instrument and on the wave finally reaching the detector. Consider a plane, time-harmonic, electromagnetic wave of infinite extent propagating through a stratified, homogeneous, isotropic medium. For such a medium it is possible to resolve any arbitrarily polarized plane wave into two independent, linearly polarized waves (normal modes): a so-called transverse electric wave (TE) whose associated electric vector is perpendicular to the plane of incidence and a transverse magnetic wave (TM) with its magnetic vector perpendicular to this plane. For each of these two modes, it has been shown by Abeles, *Ann. Phys.* (Paris) 5, 596, 706 (1950) that the incident and reflected fields on one side of the medium are linearly related to the transmitted field on the opposite side by a 2×2 unimodular matrix. This inventor has introduced a formalism that provides a unified treatment of the mathematical representation of optical instruments in terms of so-called Jones's matrices. See Fymat, A. L., "Jones's Matrix Representation of Optical Instruments, Part 1: Beam Splitters", *Applied Optics*, 10, 2499–2505 (1971), and "Part 2: Fourier Interferometers (Spectrometers and Spectropolarimeters)". See also Fymat, A. L. and Abhyankar, K. D., "An Interferometric Approach to the Measurement of Optical Polarization", *Applied Optics*, 9, 1075–1081 (1070).

The basic representation of the state of polarization of a quasimonochromatic incident light is given by the column matrix $$\vec{E} = \begin{pmatrix} E_x^i \\ E_y^i \end{pmatrix}.$$

where $E_x$ and $E_y$ are electric vector components in the plane $(x, y)$ normal to the direction of light propagation. This is referred to as Jones's (electric) vector of incident light. Before defining Jones's vector of light reaching the detector 25 in the chamber 13, through the polarizer-analyzer 24 (A), the following definitions of Jones's matrix of the interferometer-spectrophotopolarimeter are given:

$F$ is Jones's matrix of the detector-beam from the interferometer.

$M_1$, $M_2$, $M_3$ (when switched they become $M_1'$, $M_2'$, $M_3'$), $M_4'$ are Fresnel's relectance matrices of the respective mirrors $M_1$, $M_2$, $M_3$ and $M_4$.

$L_1$, $L_2$, $L_3$ and $L_4$ are Jones's matrices for the respective lenses $L_1$, $L_2$, $L_3$ and $L_4$.

$A$ is the Jones's matrix for the polarizer-analyzer A.

$R$ is Jones's general matrix for reflection by the sample cell.

$T$ is Jones's general matrix for transmission by the cell.

Considering only the spectrophotopolarimeter chamber 13, the Jones's matrices $B$ for beams reaching the detector are as follows:

Reference beam: $B \equiv B_o$ $$B_o = A \; L_1 \; M_3 \; M_2 \; M_1$$

Reflected beam: $B \equiv B_R$ $$B_R = A \; L_1 \; M_3' L_3 \; R \; L_2 \; M_2' M_1$$

Transmitted beam: $B \equiv B_T$ $$B_T = A \; L_1 \; M_3' L_3 \; T \; L_4 \; M_4' M_1'$$

From these beam matrices it is seen that when the mirror 21 is switched from its reference-mode position to its reflection-mode position, thus converting it from $M_2$ to $M_2'$, the corresponding polarization effect is compensated by the symmetric motion of the mirror 22 as it is switched from its reference-mode position to its reflection-mode position such that $M_2$ and $M_3$ becomes $M_2'$ and $M_3'$ together while $L_3$, $R$ and $L_2$ are introduced. This is evident from Fresnel's reflectance matrix readily written as follows:

$$M = \begin{pmatrix} \rho_\perp & 0 \\ 0 & \rho_\parallel \end{pmatrix}$$

where $\rho_\perp$ and $\rho_\parallel$ are Fresnel's reflection coefficients for TE and TM waves, respectively.

Comparing the matrix $B_T$ for the transmission-mode with the matrix $B_o$ for the reference-mode, it is seen that again the matrix $M_3$ becomes $M_3'$ while this time $L_3$, $T$ and $L_4$ are introduced, and that instead of $M_2$ the matrix $M_4'$ has been substituted. The position of the mirror $M_4'$ is symmetrical with the mirror $M_2'$ such that the polarization effect of the mirror $M_4'$ (when the mirror $M_1$ is switched to the position of mirror $M_1'$) is the same as the polarization effect of the mirror $M_2'$, that is to say $M_4' M_1' \equiv M_2' M_1$. That being the case, the matrix for the transmission beam may be written as follows:

$$B_T = A \; L_1 \; M_3' L_3 T \; L_4 M_2' M_1$$

It is easily seen that when in the transmission-mode, the polarization effect of the mirror 26 ($M_4'$) is compensated by the mirror 22 ($M_4'$).

Considering now the interferometer and the spectrophotopolarimeter chamber, the complete instrument, the Jones's matrices $K$ for beams reaching the detector are as follows:

Reference beam: $K \equiv K_o$ $$K_o = B_o \; F$$

Reflected beam: $K \equiv K_R$ $$K_R = B_R \; F$$

Transmitted beam: $K \equiv K_T$ $$K_T = B_T \; F$$

The matrix $F$ is of the interferometer, as noted hereinbefore, and is identical to the matrix of a detector-beam given by equation 21 in "Jones's Matrix Representation of Optical Instruments", Part 2, supra, at page 2715.

Given Jones's vector $\vec{E}^i$ of the incident light, Jones's vector, coherency matrix, and intensity of light reaching the detector for the reference, reflected and transmitted beams, are as follows.

Jones's Vector of Light Reaching the Detector

Reference beam: $\vec{E}_o = K_o \vec{E}^i$
Reflected beam: $\vec{E}_R = K_R \vec{E}^i$
Transmitted beam: $\vec{E}_T = K_T \vec{E}^i$ Coherency Matrix of Light Reaching the Detector Reference beam: $J_o = \langle \vec{E}_o \times \vec{E}_o^\dagger \rangle = K_o \; J^i \; K_o^\dagger$
Reflected beam: $J_R = \langle \vec{E}_R \times \vec{E}_R^\dagger \rangle = K_R \; J^i \; K_R^\dagger$
Transmitted beam: $J_T = \langle \vec{E}_T \times \vec{E}_T^\dagger \rangle = K_T \; J^i \; K_T^\dagger$ where $J^i = \langle \vec{E}^i \times \vec{E}^{i\dagger} \rangle$ is the coherency matrix of incident light.

Intensity of Light Reaching the Detector

Reference beam: $I_o(\tau; \sigma) = \text{Trace } J_o(\tau; \sigma)$
Reflected beam: $I_R(\tau; \sigma) = \text{Trace } J_R(\tau; \sigma)$
Transmitted beam: $I_T(\tau; \sigma) = \text{Trace } J_T(\tau; \sigma)$ (Note: The trace of a matrix is the sum of its diagonal elements.) Then, the interferograms recorded will be expressed by the following equations.

Interferograms Recorded

Reference beam: $I_o(\tau) = \int_0^\infty I_o(\tau; \sigma) d\sigma$

Reflected beam: $I_R(\tau) = \int_0^\infty I_R(\tau; \sigma) d\sigma$

Transmitted beam: $I_T(\tau) = \int_0^\infty I_T(\tau; \sigma) d\sigma$ where $\sigma$ is the reciprocal of wavelength, and $\tau$ is the optical path difference in the interferogram.

(Note: $I_o$, $I_R$ and $I_T$ depend implicitly on the transmission axis azimuth, $\theta$, of the polarizer-analyzer. In practice we will select $\theta = 0°$, 45° and 90° so that we will in fact have three interferograms for $I_o$, three for $I_R$, and three for $I_T$, giving us a total of nine interferograms.)

Theoretical analysis of the data recorded in the nine interferograms will now be rendered formally the same as in the prior patent referenced above in the following manner. Jones's matrices of the interferometer, the linear polarizer-analyzer, and of the spectrophotopolarimetric chamber will first be used to derive the fundamental equation of spectrophotopolarimetry.

Expression of $F$ (Jones's Matrix for Interferometer)

$$F = R_1 D_1 + R_2 D_2, \quad (1)$$

where $$R_1 = \exp(-i\delta/2)\mathbf{1}, \quad R_2 = \exp(i\delta/2)\mathbf{1} \quad (2)$$

are retardation matrices for the phase retardation $\delta = 2\pi\sigma\tau$ between the interferometer arms. Also $$D_1 = S_1^{(r)} M_1 S_1^{(t)}, \quad D_2 = S_2'^{(r)} M_2 S_2^{(t)} \quad (3)$$

where $S$ are Jones's matrices for the beam-splitter at reflection [superscript $(r)$] and transmission [superscript $(t)$], and $M$ are Jones's matrices for the mirrors. Subscripts 1 and 2 denote the two interferometer arms, and the prime is used to include the case where the beam-splitter is not perfectly reversible. Specifically, $$D_1 = \begin{pmatrix} r_\perp & t_\perp & \rho_\perp & 0 \\ 0 & & & r_\parallel & t_\parallel & \rho_\parallel \end{pmatrix}, \quad D_2 = \begin{pmatrix} r_\perp' & t_\perp & \rho_\perp & 0 \\ 0 & & & r_\parallel' & t_\parallel & \rho_\parallel \end{pmatrix}_2 \quad (4)$$

where $r$ and $t$ are Abeles's coefficients for the beam-splitter, $\rho$ is Fresnel's reflectance coefficient, and $\perp$ and $\parallel$ denote respectively TE and TM modes.

Expression of $A$ (Jones's Matrix for Polarizer-Analyzer)

$$A = \begin{pmatrix} A_1 & A_2 \\ A_3 & A_4 \end{pmatrix} = f \begin{pmatrix} \cos^2\theta & \cos\theta\sin\theta \\ \sin\theta\cos\theta & \sin^2\theta \end{pmatrix} \quad (5)$$

where $f$ = transmission factor, $\theta$ = azimuth of transmission axis.

Expression of $B$ (Jones's Matrix of Spectrophotopolarimetric Chamber)

For mirrors: $M_1, M_2, M_3$ and $M_1', M_2', M_3'$ and $M_4'$ (all given for any kind of mirror in Paper 2, supra), For Lenses: $L_1, L_2, L_3, L_4$. Very generally we will have:

$$B = \begin{pmatrix} B_1 & B_2 \\ B_3 & B_4 \end{pmatrix}, \quad B \equiv B_o, B_R, B_T, \quad (6)$$

because $A$ is a complete 2×2 matrix and also because $$R = \begin{pmatrix} R_1 & R_2 \\ R_3 & R_4 \end{pmatrix}, \quad T = \begin{pmatrix} T_1 & T_2 \\ T_3 & T_4 \end{pmatrix}. \quad (7)$$

Then, Jones's vector of light reaching the detector will be:

$$\vec{E} = B(R_1 D_1 + R_2 D_2)\vec{E}^i, \quad (8)$$

where $B \equiv B_o, B_R, B_T; \vec{E} \equiv \vec{E}_o, \vec{E}_R, \vec{E}_T$ that is $$\vec{E} = \begin{pmatrix} (\alpha_1 \cos\delta/2 - i\beta_1 \sin\delta/2)E_x^i + (\alpha_2 \cos\delta/2 - i\beta_2 \sin\delta/2)E_y^i \\ (\alpha_3 \cos\delta/2 - i\beta_3 \sin\delta/2)E_x^i + (\alpha_4 \cos\delta/2 - i\beta_4 \sin\delta/2)E_y^i \end{pmatrix} \quad (9)$$

In this last expression, the coefficients $\alpha$ and $\beta$ are expressed by:

$$\begin{aligned}\alpha_1 &= B_1(D_{11}+D_{21}) \\ \alpha_2 &= B_2(D_{14}+D_{24}) \\ \alpha_3 &= B_3(D_{11}+D_{21}) \\ \alpha_4 &= B_4(D_{14}+D_{24})\end{aligned}, \quad \begin{aligned}\beta_1 &= B_1(D_{11}-D_{21}) \\ \beta_2 &= B_2(D_{14}-D_{24}) \\ \beta_3 &= B_3(D_{11}-D_{21}) \\ \beta_4 &= B_4(D_{14}-D_{24})\end{aligned} \quad (10)$$

(Note: When $B \equiv B_o$ (reference), the values of the $\alpha$'s and the $\beta$'s must be evaluated from above equations using the elements of $B_o$; likewise, when $B \equiv B_R$ (reflection) or $B \equiv B_T$ (transmission). Thus, to each of these three beams corresponds a different set of $\alpha$'s and $\beta$'s.)

According to previous discussion of the coherency matrix of light reaching the detector, we form the coherency matrix $J \equiv J_o, J_R, J_T$ from $\vec{E} \equiv \vec{E}_o, \vec{E}_R, \vec{E}_T$ given above, and take its trace to obtain the intensity $I \equiv I_o, I_R, I_T$ reaching the detector. We get $$I(\tau;\sigma) = a_1(\sigma) + a_2(\sigma)\cos\delta + a_3(\sigma)\sin\delta, \quad (11)$$

where $\delta = 2\pi\sigma\tau$. There is one set of coefficients $a_1, a_2$ and $a_3$ for each beam (reference, reflected, transmitted). These coefficients are known linear relations between the elements of $J$:

$$a(\sigma) = \sum_l j_l(\sigma) J_l(\sigma), \quad l = 1 \text{ to } 4, \quad (12)$$

where $a \equiv a_1, a_2, a_3$, and $J_l$ are elements of $J$. In other words, for any coefficient $a$, we have:

$$a(\sigma) = i(\sigma)I(\sigma) + q(\sigma)Q(\sigma) + u(\sigma)U(\sigma) + v(\sigma)V(\sigma), \quad (13)ps$$

the so-called Stokes's coefficients $i, q, u$ and $v$ (which may be complex numbers) being known. The $J_l$ and the Stokes's parameters I, Q, U and V are related by $$\begin{aligned} I &= J_1 + J_4 \\ Q &= J_1 - J_4 \\ U &= J_2 + J_3 \\ V &= -i(J_2 - J_3) \end{aligned} \quad (14)$$

so that $j_1 = i+q$; $j_2 = u-iv$; $j_3 = u+iv$; $j_4 = i-q$. The expressions of the Stokes's coefficients will vary according to the value of $\theta$, the transmission axis azimuth of the polarizer-analyzer. Also, in the interferogram, $I(\tau)$, only the variable part, i.e. $a_2$ and $a_3$, is relevant. The constant part, $a_1$, although it also contains information on the Stokes's polarization parameters of the light reaching the detector, is not usually employed in interferometry. Introducing the auxiliary quantities $\rho(\sigma)$ and $\psi(\sigma)$ by the equations $$\begin{aligned} a_2(\sigma) &= \rho(\sigma)\cos\psi(\sigma) \\ a_3(\sigma) &= \rho(\sigma)\sin\psi(\sigma) \end{aligned}, \quad (15)$$

equation (11) becomes $$I(\tau;\sigma) = d(\sigma)\{a_1(\sigma) + \rho(\sigma)\cos[\delta - \psi(\sigma)]\}, \quad (16)$$

where $d(\sigma)$ is a factor representing the instrument sensitivity. It may be noted that in an ideal Michelson interferometer, the quantity $\psi(\sigma)$ would not be present so that the corresponding interferogram would be perfectly symmetrical about its origin. Here, however, the effect of the spectrophotopolarimetric chamber has been the deliberate introduction of the phase factor $\psi(\sigma)=\tan^{-1}[a_3(\sigma)/a_2(\sigma)]$. Thus, asymmetries in the interferogram, due to this factor, will be of central importance in determining the complete state of polarization of the reference, reflected, and transmitted beams. Equation (11), or its alternate form in equation (16), is the fundamental equation of spectrophotopolarimetry. This equation is formally identical to the corresponding fundamental equation of spectropolarimetry, equation (9) of the prior patent referenced above. The interferogram analysis described in that patent will therefore also apply in the present case providing the appropriate expressions for the a-coefficients, or alternatively the Stokes's polarization coefficients, are used. The expressions of the latter coefficients will be provided below.

We will now consider the three orientations: $\theta=0°$, $45°$ and $90°$. The corresponding arrangements will be denoted $A(\theta)$. The measurements will be performed according to either of the two alternatives:

i. All three interferograms corresponding to $\theta=0°, 45°$ and $90°$ will be recorded sequentially first for the reference beam, then for the reflected beam and lastly for the transmitted beam. In this manner, the number of manipulations of the mirrors 20, 21, 22 and 26 is reduced to a minimum as compared to the case where the transmitted beam is considered prior to the reflected beam.

ii. For each orientation $\theta$, the three interferograms for the reference, the reflected and the transmitted beams are taken successively. The operation is repeated for each of the remaining two orientations.

The former alternative is preferred because it involves a minimum of operations (positioning of mirrors), thus limiting the number of manipulations and thereby minimizing the experimental errors.

The Stokes's coefficients for the three orientations are given in the following table:

wise for the sine part of the interferogram, i.e. $a_3(\sigma)$. These two relations provide both (I+Q) since $i=q$ and, hence, are not independent since they depart only by a constant factor: $\frac{1}{4}(|\alpha_1|^2-|\beta_1|^2)$ in the first case and $i/4(\alpha_1\beta_1^*-\beta_1\alpha_1^*)$ in the latter case.

Similarly, for the arrangement $A_2$. We will obtain two dependent relations for (I-Q). By using either the cosine parts or the sine parts of both arrangements $A_1$, and $A_2$ we should get I and Q separately. The two determinations of I and Q, from the cosine parts and from the sine parts must, of course, be consistent with each other within experimental noise. This in fact provides one check for both the method and the corresponding experiment.

The arrangement $A_3$ provides only two linear relationships between all Stokes's parameters, one from $a_2(\sigma)$ and one from $a_3(\sigma)$. However, because I and Q are now known from $A_1$ and $A_2$, these relations are now only between U and V. Note that the relations are this time independent because $u$ and $v$ for $a_2(\sigma)$ are different from their corresponding values for $a_3(\sigma)$. The two relations will be therefore sufficient for determining U and V separately.

Hence, three interferograms, corresponding to the arrangements $A_1, A_2$ and $A_3$, will be sufficient for determining the complete set of Stokes's parameters. However, if one is only interested in I and Q, only two interferograms, obtained with $A_1$ and $A_2$, will be sufficient.

On removing the polarizer-analyzer, the instrument converts to a Fourier interferometer-spectrophotometer which provides Stokes's parameter I from a single interferogram. This I and the one provided by $A_1$ and $A_2$ must, of course, be consistent. Thus, a second check consists in comparing the I's provided by the spectrophotopolarimeter (arrangements $A_1$ and $A_2$) and the spectrophotometer.

Although particular embodiments of the invention have been described and illustrated herein, it is recognized that modifications and equivalents may readily occur to those skilled in the art. For example, a spherical sample cell may be substituted, or a flat cell (slide) used for the sample. In the case of the latter, it would be a simple matter to orient it normal to the beam in the transmission mode and at the proper position for the reflection mode. Consequently, it is intended that the claims be interpreted to cover such modifications and equivalents.

What is claimed is:

Table

Stoke's Polarization Coefficients for Spectrophotopolarimetry

|  |  | $A_1=A(\theta=0°)$ | $A_2=A(\theta=90°)$ | $A_3=A(\theta=45°)$ |
|---|---|---|---|---|
| $a_2$ | i | $1/4(|\alpha_1|^2-|\beta_1|^2)$ | $1/4(|\alpha_4|^2-|\beta_4|^2)$ | $1/2(|\alpha_1|^2-|\beta_1|^2+|\alpha_2|^2-|\beta_2|^2)$ |
|  | q | $1/4(|\alpha_1|^2-|\beta_1|^2)$ | $-1/4(|\alpha_4|^2-|\beta_4|^2)$ | $1/2(|\alpha_1|^2-|\beta_1|^2-|\alpha_2|^2+|\beta_2|^2)$ |
|  | u | 0 | 0 | $\mathrm{Re}(\alpha_1\alpha_2^*-\beta_1\beta_2^*)$ |
|  | v | 0 | 0 | $-\mathrm{Im}(\alpha_1\alpha_2^*-\beta_1\beta_2^*)$ |
| $a_3$ | i | $i/4(\alpha_1\beta_1^*-\beta_1\alpha_1^*)$ | $i/4(\alpha_4\beta_4^*-\beta_4\alpha_4^*)$ | $i/2(\alpha_1\beta_1^*-\beta_1\alpha_1^*+\alpha_2\beta_2^*-\beta_2\alpha_2^*)$ |
|  | q | $i/4(\alpha_1\beta_1^*-\beta_1\alpha_1^*)$ | $-i/4(\alpha_4\beta_4^*-\beta_4\alpha_4^*)$ | $i/4(\alpha_1\beta_1^*-\beta_1\alpha_1^*-\alpha_2\beta_2^*+\beta_2\alpha_2^*)$ |
|  | u | 0 | 0 | $-\mathrm{Im}(\alpha_1\beta_2^*-\beta_1\alpha_2^*)$ |
|  | v | 0 | 0 | $-\mathrm{Re}(\alpha_1\beta_2^*-\beta_1\alpha_2^*)$ | where Re=real part and Im=imaginary part, and * denotes complex conjugate.

Note: Since the $\alpha$'s and the $\beta$'s vary according to the beam considered (reference, reflected, transmitted), there is one such table for each beam. These tables are obtained on using the appropriate $\alpha$ and $\beta$ values as discussed hereinabove.

In the arrangement $A_1$, the cosine part of the interferogram, i.e. $a_2(\sigma)$, will only yield a relationship between I and Q (since the coefficients $u$ and $v$ vanish). Like- 1. A high-resolution Fourier interferometer-spectrophotopolarimeter for producing interferograms from which all four Stokes's parameters can be determined defining both intensity and the state of polarization of radiation transmitted through and reflected from a sample, said apparatus comprising:
   an interferometer,
   a radiation detector,
   a polarizer-analyzer of variable orientation directly in front of said detector,
   a sample cell, and
   means for directing the output beam of said interferometer to said detector through said polarizer-analyzer selectively (i) around said cell for reference-beam interferograms, (ii) through said cell for transmission interferograms and (iii) with a predetermined angle of reflection from said cell for reflection interferograms with compensation for any polarization effect on the beam in the transmission and reflection modes not also present in the reference mode.

2. Apparatus as defined in claim 1 wherein said polarizer-analyzer is a linear polarizer-analyzer having a transmission axis azimuth which is positionable in the three orientations of 0°, 45° and 90°.

3. Apparatus as defined in claim 2 wherein said means comprises a first switching mirror in the direct path of the interferometer beam for altering the direction of the beam 90° in one direction to a pair of switching mirrors which reflect at the same angle in one position to successively alter the beam direction 90° for the reference interferograms, and altering the beam direction successively through a smaller angle for the reflection interferograms in a second position said first switching mirror altering the direction of said interferometer beam 90° in a direction opposite the one direction to a pair of parallel mirrors for transmission interferograms.

4. Apparatus as defined in claim 3 wherein the second mirror of the pair for transmission interferograms is the same as the second mirror of the pair for the reflection interferograms when the second mirror of the pair for the reflection interferogram is in the second position, whereby only three mirrors are used for the reference and reflection interferograms, and a fourth mirror is used with two of the first three mirrors for the transmission interferograms.

5. Apparatus as defined in claim 4 wherein all components from said interferometer to said detector are contained in a vacuum chamber.

6. In an instrument for producing interferograms from which at least Stokes's parameter I defining intensity is to be determined for radiation transmitted through and reflected from a sample, the combination comprising
   an interferometer,
   a radiation detector,
   a sample cell, and
   means for selectively directing the output beam of said interferometer to said detector around said cell for producing a reference-beam interferogram, through said cell for producing a transmission interferogram, and with a predetermined angle of reflection from said cell for producing a reflection interferogram with compensation for any effect on the beam in the transmission and reflection modes not also present in the reference mode.

7. Apparatus as defined in claim 6 wherein all components from said interferometer to said detector are contained in a vacuum chamber.

8. Apparatus as defined in claim 7 wherein said means comprises a first switching mirror, a pair of switching mirrors and a fourth fixed mirror, said first switching mirror being in the direct path of said beam from said interferometer for selectively reflecting said beam in one direction or in another direction, said beam being reflected in said one direction to a first one of a pair of switching mirrors, both of which are switchable to one of two positions, the first position being arranged to successively reflect said beam at equal angles for directing said beam received from said first switching mirror around said cell to said detector in a fixed position, the second being arranged to reflect said beam at equal angles with the first of said pair reflecting said beam received from said first switching mirror to said cell and the second of said pair reflecting said beam received from said cell to said detector, and said fixed mirror being in the path of said beam reflected by said first switching mirror in said opposite direction and being disposed parallel to said second of said pair of mirrors to reflect light through said cell to the second of said pair of mirrors while in the second position for reflection to said detector.

9. Apparatus as defined in claim 8 wherein said first switching mirror so reflects said interferometer beam as to alter its direction through 90° in both said one and said other direction, said other direction being opposite said one direction, and each said pair of switchable mirrors so reflecting said beam from said first switchable mirror as to alter its direction through 90°.

10. Apparatus as defined in claim 9 including a linear polarizer-analyzer the transmission axis of which is positionable in the three orientations of 0°, 45° and 90°, whereby all four Stokes's parameters can be determined for radiation transmitted through and reflected from a medium in said sample cell.

11. In a high-resolution Fourier interferometer-spectrophotopolarimeter for producing interferograms from which all four Stokes's parameters can be determined from the equation $$I(\tau;\sigma) = a_1(\sigma) + a_2(\sigma)\cos\delta + a_3(\sigma)\sin\delta,$$

where $\sigma$ is the reciprocal of wavelength, $\tau$ is the optical path difference in the interferometer, $\delta = 2\pi\sigma\tau$, and the $a$'s are known linear relations between the elements of $J$ $$a(\sigma) = \sum_l j_l(\sigma) J_l(\sigma)$$

where $l = 1$ to $4$, $a \equiv a_1, a_2, a_3$ and $J_l$ are elements of a coherency matrix $J \equiv J_o, J_R, J_T$ formed from the light vectors $\vec{E} \equiv \vec{E}_o, \vec{E}_R, \vec{E}_T$ and subscripts $o$, $R$ and $T$ stand for reference, reflection and transmission, respectively, the combination comprising
   an interferometer,
   a radiation detector,
   a linear polarizer-analyzer of variable orientation directly in front of said detector, said polarizer-analyzer having a transmission axis azimuth which is positionable in the three orientations of 0°, 45° and 90°,
   a sample cell, and means for directing the output beam of said interferometer to said detector through said polarizer-analyzer selectively (i) around said cell for reference-beam interferograms, (ii) through a sample in said cell for transmission interferograms and (iii) with a predetermined angle of reflection from a sample in said cell for reflection interferograms, with compensation for any polarization effect on the beam in the transmission and reflection modes not also present in the reference mode.

12. The combination of claim 11 wherein said means comprises a first switching mirror in the direct path of the interferometer beam for altering the direction of the beam 90° in one direction to a pair of switching mirrors which reflect at the same angle in one position to successively alter the beam direction 90° for the reference interferograms, and altering the beam direction successively through a smaller angle for the reflection interferograms in a second position said first switching mirror altering the direction of said interferometer beam 90° in a direction opposite the one direction to a pair of parallel mirrors for transmission interferograms.

13. The combination of claim 12 wherein the second mirror of the pair for transmission interferograms is the same as the second mirror of the pair for the reflection interferograms when the second mirror of the pair for the reflection interferograms is in the second position, whereby only three mirrors are used for the reference and reflection interferograms, and a fourth mirror is used with two of the first three mirrors for the transmission interferograms.

14. In a high-resolution Fourier interferometerspectrophotopolarimeter for producing the interferograms from which only the Stokes's parameters defining intensity (I) and degree of polarization (Q) are determined independently of the remaining parameters defining the orientation of the plane of polarization (U) and the ellipticity of the polarization ellipse (V) from the equation $$I(\tau;\sigma) = a_1(\sigma) + a_2(\sigma)\cos\delta + a_3(\sigma)\sin\delta,$$

where $\sigma$ is the reciprocal of wavelength, $\tau$ is the optical path difference in the interferometer, $\delta = 2\pi\sigma\tau$, and the $a$'s are known linear relations between the elements of $\underline{J}$ $$a(\sigma) = \sum_l j_l(\sigma) J_l(\sigma)$$

where $l = 1$ to $4$, $a \equiv a_1, a_2, a_3$ and $J_l$ are elements of a coherency matrix $\underline{J} \equiv \underline{J}_o, \underline{J}_R, \underline{J}_T$ formed from the light vectors $\vec{E} \equiv \vec{E}_o, \vec{E}_R, \vec{E}_T$ and subscripts $o$, $R$ and $T$ stand for reference, reflection and transmission, respectively, the combination comprising
    an interferometer,
    a radiation detector,
    a linear polarizer-analyzer of variable orientation directly in front of said detector, said polarizer-analyzer having a transmission axis azimuth which is positionable in the orientation of 0° and 90°,
    a sample cell, and
    means for directing the output beam of said interferometer to said detector through said polarizer-analyzer selectively (i) around said cell for reference-beam interferograms, (iii) through a sample in said cell for transmission interferograms and (iii) with a predetermined angle of reflection from a sample in said cell for reflection interferograms, with compensation for any polarization effect on the beam in the transmission and reflection modes not also present in the reference mode, said two Stokes's parameters I and Q being determinable by using either the cosine parts or the sine parts of the aforesaid equation in analyzing interferograms obtained in the two orientations of 0° and 90° without determining the remaining parameters U and V.

15. The combination of claim 14 wherein said means comprises a first switching mirror in the direct path of the interferometer beam for altering the direction of the beam 90° in one direction to a pair of switching mirrors which reflect at the same angle in one position to successively alter the beam direction 90° for the reference interferograms, and altering the beam direction successively through a smaller angle for the reflection interferograms in a second position said first switching mirror altering the direction of said interferometer beam 90° in a direction opposite the one direction to a pair of parallel mirrors for transmission interferograms.

16. The combination of claim 15 wherein the second mirror of the pair for transmission interferograms is the same as the second mirror of the pair for the reflection interferograms when the second mirror of the pair for the reflection interferograms is in the second position, whereby only three mirrors are used for the reference and reflection interferograms, and a fourth mirror is used with two of the first three mirrors for the transmission interferograms.

* * * * *